United States Patent
Tucker et al.

(10) Patent No.: US 10,474,973 B2
(45) Date of Patent: Nov. 12, 2019

(54) AIRCRAFT FLEET MAINTENANCE SYSTEM

(71) Applicant: Bell Helicopter Textron Inc., Fort Worth, TX (US)

(72) Inventors: Brian Tucker, Fort Worth, TX (US); Brian Mesing, Vero Beach, FL (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 299 days.

(21) Appl. No.: 14/715,736

(22) Filed: May 19, 2015

(65) Prior Publication Data
US 2016/0342930 A1     Nov. 24, 2016

(51) Int. Cl.
G06Q 10/06 (2012.01)
G06Q 10/00 (2012.01)

(52) U.S. Cl.
CPC .......... *G06Q 10/063118* (2013.01); *G06Q 10/06398* (2013.01); *G06Q 10/20* (2013.01)

(58) Field of Classification Search
CPC .............................. G06Q 10/00; G06Q 30/02
USPC ................................................ 705/7.11–7.42
See application file for complete search history.

(56) References Cited

U.S. PATENT DOCUMENTS

| | | |
|---|---|---|
| 6,219,597 B1 | 4/2001 | Longere |
| 6,738,748 B2 | 5/2004 | Wetzer |
| 7,174,233 B1 | 2/2007 | Blackshear et al. |
| 7,457,763 B1 | 11/2008 | Garrow et al. |
| 7,983,809 B2 | 7/2011 | Kell et al. |
| 7,984,146 B2 | 7/2011 | Rozak et al. |
| 9,120,271 B2 * | 9/2015 | Bell .......... B29C 70/10 |
| 2001/0032103 A1 * | 10/2001 | Sinex ............... G06Q 10/025 705/4 |
| 2001/0032110 A1 | 10/2001 | Sinex |
| 2003/0061261 A1 * | 3/2003 | Greene ............ G06Q 10/06 718/104 |
| 2003/0191563 A1 * | 10/2003 | Eagleton ......... G05B 23/0229 701/33.4 |

(Continued)

FOREIGN PATENT DOCUMENTS

DE     102008062630 A1    6/2010
EP         3096269 A1    11/2016

(Continued)

OTHER PUBLICATIONS

Office Action in related U.S. Appl. No. 14/715,783, dated Jul. 7, 2016, 47 pages.

(Continued)

*Primary Examiner* — Robert D Rines
(74) *Attorney, Agent, or Firm* — Patent Capital Group

(57) ABSTRACT

According to one example embodiment, an aircraft fleet maintenance system includes a maintenance analysis engine and an operator feedback system. The maintenance analysis engine is configured to receive, from each of a plurality of aircraft maintainers, feedback information associated with how each of the aircraft maintainers performed an aircraft maintenance action and to compile the received feedback information from two or more of the plurality of aircraft maintainers to yield compiled maintenance trend data. The operator feedback system is configured to transmit the compiled maintenance trend data to at least one of the plurality of aircraft maintainers.

18 Claims, 6 Drawing Sheets

(56) References Cited

U.S. PATENT DOCUMENTS

| | | | |
|---|---|---|---|
| 2003/0195675 A1* | 10/2003 | Felke | G05B 23/0278 701/29.3 |
| 2004/0167907 A1 | 8/2004 | Wakefield et al. | |
| 2005/0055239 A1 | 3/2005 | Farmer | |
| 2005/0065842 A1 | 3/2005 | Summers | |
| 2005/0171661 A1 | 8/2005 | Abdel-Malek et al. | |
| 2005/0240555 A1 | 10/2005 | Wilde et al. | |
| 2006/0089846 A1 | 4/2006 | Middlebrook | |
| 2006/0224357 A1 | 10/2006 | Taware et al. | |
| 2006/0235707 A1 | 10/2006 | Goldstein et al. | |
| 2007/0124223 A1 | 5/2007 | Avery et al. | |
| 2007/0294052 A1* | 12/2007 | Stathis | G06Q 10/06 702/185 |
| 2009/0063238 A1 | 3/2009 | Storzum et al. | |
| 2009/0164490 A1* | 6/2009 | Wininger | G06Q 10/06 |
| 2010/0042283 A1* | 2/2010 | Kell | G06Q 10/06 701/29.3 |
| 2010/0050065 A1* | 2/2010 | Hooks | G06Q 10/06 715/205 |
| 2010/0125379 A1 | 5/2010 | Fournier et al. | |
| 2011/0082717 A1* | 4/2011 | Saad | G06Q 10/06 705/7.13 |
| 2011/0270482 A1* | 11/2011 | Holzer | G05B 19/4184 701/31.4 |
| 2012/0283963 A1 | 11/2012 | Mitchell et al. | |
| 2013/0166135 A1* | 6/2013 | Dunsdon | B64F 5/0045 701/29.3 |
| 2016/0342920 A1 | 11/2016 | Tucker et al. | |
| 2016/0342956 A1 | 11/2016 | Tucker et al. | |
| 2016/0343044 A1 | 11/2016 | Tucker et al. | |
| 2019/0080524 A1 | 3/2019 | Tucker | |

FOREIGN PATENT DOCUMENTS

| | | |
|---|---|---|
| EP | 3267375 A1 | 1/2018 |
| EP | 3457243 A1 | 3/2019 |
| WO | 2007149181 A2 | 12/2007 |
| WO | 2007149181 A3 | 12/2007 |
| WO | 2009085476 A1 | 7/2009 |
| WO | 2010070070 A1 | 6/2010 |
| WO | 2015131193 A1 | 9/2015 |

OTHER PUBLICATIONS

Final Office Action in related U.S. Appl. No. 14/715,783, dated Mar. 16, 2017, 57 pages.
USPTO Non-Final Office Action in U.S. Appl. No. 14/715,783, dated Oct. 12, 2017.
USPTO Final Rejection in U.S. Appl. No. 14/715,783, dated Feb. 28, 2018, 72 pages.
EPO Official Action in EP Patent Application Serial No. 17177724.6 dated Nov. 28, 2017, 6 pages.
EPO Search Report in EP Patent Application Serial No. 17177724.6 dated Sep. 28, 2017, 4 pages.
Examination Report in European Patent Application Serial No. 15178513.6 dated May 3, 2016 (5 pages).
Extended Search Report in European Patent Application Serial No. 15178513.6 dated Feb. 19, 2016 (3 pages).
Provision of the Minutes of the Oral Proceedings and Decision to Refuse the Application in EP Patent Application Serial No. 15178513.6 dated Aug. 1, 2017, 35 pages.
Summons to Attend Oral Proceedings Pursuant to Rule 115(1) EPC in European Patent Application Serial No. 15178513.6 mailed on Dec. 15, 2016, (10 pages).
USPTO Final Rejection in U.S. Appl. No. 14/715,783, dated Feb. 28, 2018, 59 pages.
USPTO Non-Final Office Action in U.S. Appl. No. 14/715,773, dated Dec. 29, 2017, 27 pages.
Examination Report in European Patent Application Serial No. 18162679.7 dated Oct. 30, 2018, 12 pages.
Summons to Attend Oral Proceedings Pursuant to Rule 115(1) EPC in European Patent Application Serial No. 17177724.6 mailed on Jun. 19, 2018 (11 pages).
USPTO Final Office Action in U.S. Appl. No. 14/715,773, dated Jul. 26, 2018, 29 pages.
USPTO Non-Final Office Action in U.S. Appl. No. 14/715,715, dated Aug. 9, 2018; 28 pages.
EPO Decision to Refuse Patent Application in European Patent Application Serial No. 17177724.6 dated Dec. 3, 2018, 23 pages.
EPO Examination Report for EP Application No. 18162679.7 dated Feb. 25, 2019, 9 pages.
EPO Search Report for EP Application No. 18162679.7 dated Feb. 12, 2019, 6 pages.
EPO Examination Report for EP Application No. 18162679.7 dated Jun. 18, 2019, 4 pages.

* cited by examiner

AIRCRAFT FLEET MAINTENANCE SYSTEM

TECHNICAL FIELD

This invention relates generally to aircraft health, and more particularly, to an aircraft fleet maintenance system.

BACKGROUND

An aircraft may perform a variety of different missions. Some missions may subject the aircraft to more damage than other missions. An aircraft may be maintained by an aircraft maintainer. An aircraft maintainer may perform actions such as conducting inspections, repairing/replacing parts, and logging maintenance activities.

One example of an aircraft is a rotorcraft. A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to improve aircraft maintenance performance. A technical advantage of one embodiment may include the improve performance by other parties, such as suppliers of aircraft components. A technical advantage of one embodiment may include the capability to improve analysis of maintenance information and/or health information by using one set of information to assess the accuracy of the other set of information.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
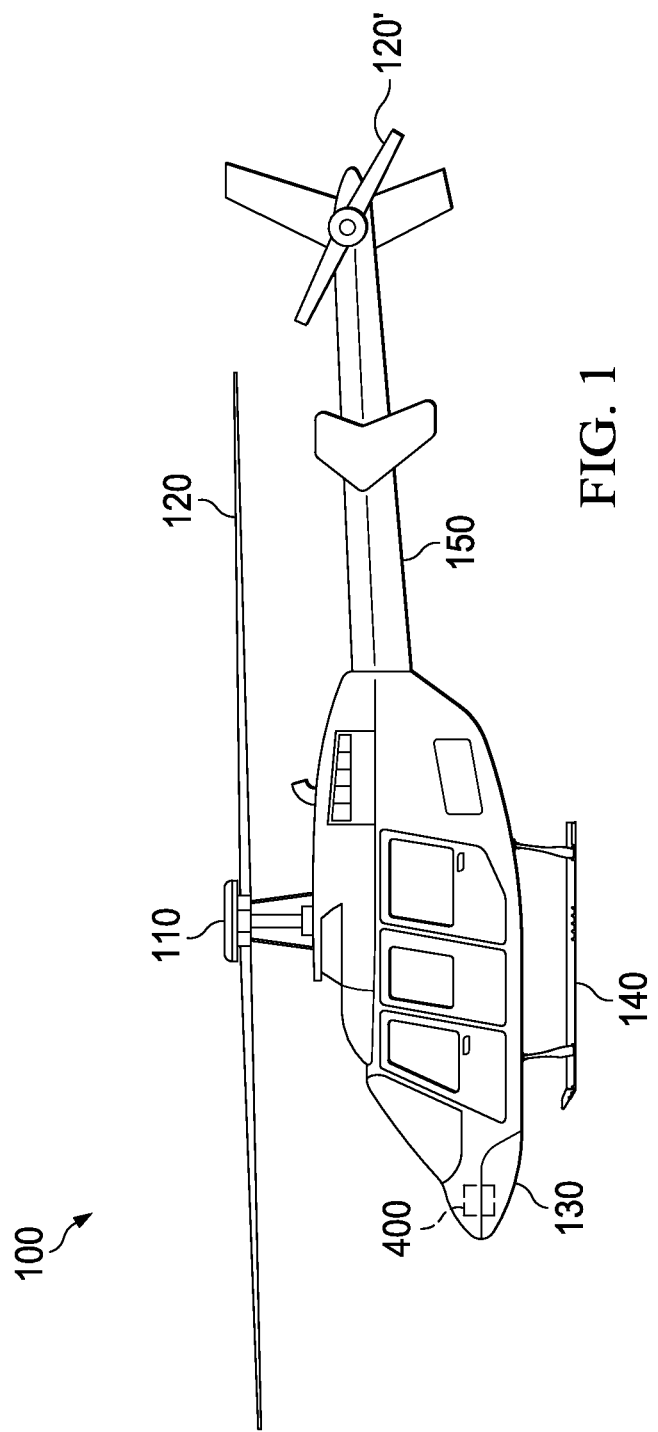
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings regarding rotorcraft 100 may apply to aircraft and vehicles other than rotorcraft, such as airplanes and unmanned aircraft, to name a few examples.

Rotorcraft 100 and its components may be subject to a variety of different loads during operation. These loads may be the result of various forces and stresses applied on the aircraft. Some aircraft missions may include more high-load transient maneuvers, whereas other missions may include more low-load, steady-state flight. Some aircraft may also be subject to damage as the result of shocks, vibrations, and temperature exposure. Loads may be the result of activity occurring while the aircraft is operating in the air or when the aircraft is on the ground.

These loads may lead to wear and tear on various aircraft components. An aircraft maintainer may perform actions such as conducting inspections, repairing/replacing components, and logging maintenance activities. The aircraft maintainer may perform these actions according to a schedule (e.g., manufacturer's suggested maintenance schedule based on flight hours), in response to an incident (e.g., a hard landing), based on health-related sensor measurements (e.g., readings from a bearing-wear sensor), or at any other appropriate moments or intervals. The aircraft maintainer may perform these actions using maintenance instructions and training, the aircraft maintainer's expertise/experience, and/or other sources of knowledge. An aircraft owner/operator may also serve as the aircraft maintainer or may hire an outside aircraft maintainer.

Teachings of certain embodiments recognize the capability to improve aircraft maintenance performance. For example, teachings of certain embodiments recognize the capability to identify concerns with the way aircraft maintainers are performing maintenance actions and take corrective action depending on whether the concerns are common to many aircraft maintainers or are specific to few aircraft maintainers. As another example, teachings of certain embodiments recognize the capability to provide trend data to aircraft maintainers that may allow the aircraft maintainers to assess their performance relative to their peers.

Teachings of certain embodiments also recognize the capability to improve performance by other parties. For example, teachings of certain embodiments recognize the capability to improve supplier performance by using maintenance information and/or health information to assess how an aircraft part provided by a supplier performs relative to aircraft parts provided by other suppliers. As another example, teachings of certain embodiments recognize the capability to improve analysis of maintenance information and/or health information by using one set of information to assess the accuracy of the other set of information.

Figure 2:
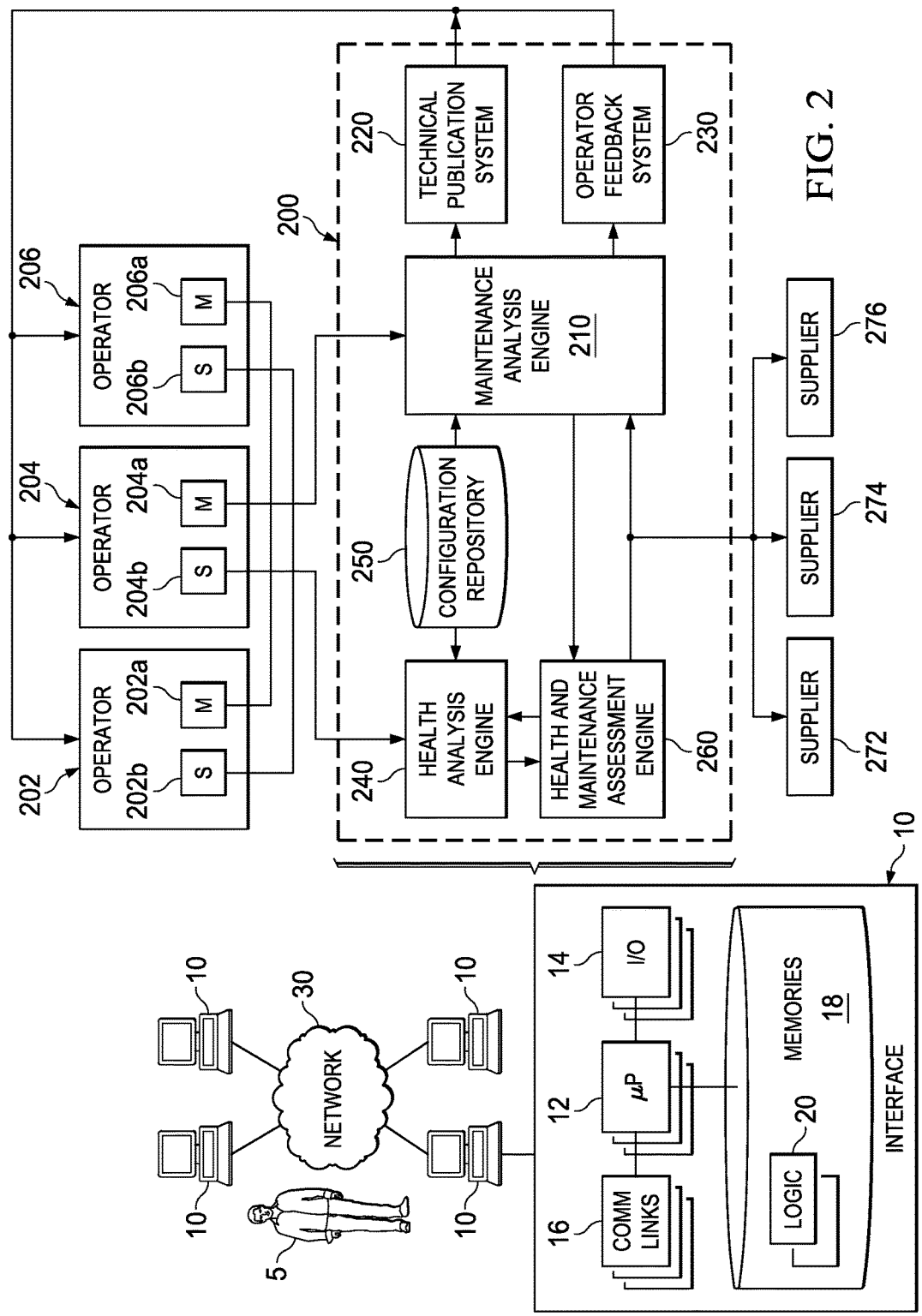
FIG. 2 shows one example embodiment of a health and maintenance system that may be utilized in accordance with an aircraft such as the aircraft of FIG. 1.

FIG. 2 shows a health and maintenance system 200 according to one example embodiment. In the example of FIG. 2, system 200 features a maintenance analysis engine 210, a technical publication system 220, an operator feedback system 230, a health analysis engine 240, a configuration repository 250, and a health and maintenance assessment engine 260, which may be implemented by one or more computers 10 communicating across one or more networks 30 and accessible by a user 5. Example of computer systems may include, but are not limited to, a computer installed on-board an aircraft such as rotorcraft 100 (e.g., a flight control computer), a ground station computer, a maintenance computer, a data processing server, and an end-user computer. In various embodiments, elements of system 200 may be installed on-board an aircraft, off-board, or a combination of the two.

Users 5 may access system 200 through computer systems 10. Users 5 may include any individual, group of individuals, entity, machine, and/or mechanism that interacts with computer systems 10. Examples of users 5 include, but are not limited to, a maintenance person, pilot, engineer, technician, owner, operator, contractor, agent, and/or employee. Some of these terms may be used interchangeably throughout; for example, an owner may also be an operator. Generally, these terms should be construed to represent any party having a role associated with an aircraft without the role being given a specific or narrow meaning.

Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

In the example of FIG. 2, operators 202-206 provide maintenance data 202a-206a and sensor data 202b-206b to system 200. Maintenance data 202a-206a may represent information recorded, logged, or otherwise captured during the maintenance of an aircraft. Maintenance data 202a-206a may reveal, for example, when and how aircraft maintenance actions were performed. In some embodiments, maintenance data 202a-206a may be provided via maintenance software.

Sensor data 202b-206b may represent measurements received from one or more sensors installed on an aircraft that represent at least one load applied against the aircraft over a period of time. Examples of such measurements may include, but are not limited to, aircraft and component environmental data, aircraft and component discrete-event data, aircraft and component state data, and direct and indirect load measurements.

Maintenance analysis engine 210 analyzes the maintenance data 202a-206a received from each of the operators 202-206 to identify a potential maintenance concern and determine whether the potential maintenance concern is common to many aircraft maintainers or are specific to aircraft maintainers. Maintenance analysis engine 210 may also generate trend data that assesses how aircraft maintainers perform relative to their peers. Note that terms such as "operator" and "aircraft maintainer" may be used interchangeably where appropriate and may generally refer to any user associated with user 200.

Maintenance analysis engine 210 may communicate to operators 202-206 through a variety of mechanisms, including but not limited to technical publication system 220 and operator feedback system 230. Technical publication system 200 may represent any publications that provide instructions and/or assistance as to how to perform maintenance on an aircraft such as rotorcraft 100. In one example embodiment, technical publication system 200 may represent an interactive electronic technical manual (IETM). An IETM is an electronic portal to manage technical documentation. An IETM may, for example, compress volumes of text into CD-ROMs or online pages delivered over the internet. An IETM may include sound, video, and other interactive components. An IETM may allow readers to locate information far more rapidly than in paper manuals.

In some embodiments, technical publication system 220 may share functionality with aircraft maintenance software that provides maintenance data 202a-206a. For example, in some embodiments, technical publication system 220 may feature an electronic maintenance manual that tracks whether an aircraft maintainer consulted the electronic maintenance manual when performing an aircraft maintenance action and how long the aircraft maintainer spent on each step during performance of the aircraft maintenance action (e.g., how much time is spent performing the task and/or how much time is spent reviewing the explanation provided as to how to perform the task). This information may represent another form of maintenance data 202a-206a and thus may be utilized by system 200 even if it is not received directly from separate aircraft maintenance software (e.g., if it is received through an operator's maintenance management system or another source of information).

Operator feedback system 230 may represent any feedback mechanism that provides feedback to one or multiple operators 202-206 (or aircraft maintainers, owners, or any other users 5). In some embodiments, operator feedback system 230 provides specialized information to individual operators, such as specialized training on a maintenance procedure if a particular aircraft maintainer is having unique issues with the maintenance procedure. In some embodiments, operator feedback system 230 provides information regarding multiple operators, such as is the case with trend data that compares performance of a single aircraft maintainer with performance of the maintainer's peers.

Health analysis engine 240 processes health information received from operators 202-206. In the example of FIG. 2, this health information may come in the form of sensor data 202b-206b. In some embodiments, health analysis engine 240 may convert sensor data 202b-206b into information that more directly reflects the health of the aircraft or of an aircraft component (e.g., convert sensor data into remaining useful life).

In some scenarios, components may be removed from a first aircraft and installed on a second aircraft. In this scenario, it may be necessary to track component health separately from aircraft health. Accordingly, teachings of certain embodiments recognize the capability to provide a configuration repository 250 to track aircraft configurations and allow health analysis engine 240 to convert aircraft-centric sensor data 202b-206b into component-centric health data.

Health and maintenance assessment engine 260 correlates maintenance data from maintenance analysis engine 210 and health data from health analysis engine 240 and provides information based on these correlations. In one example embodiment, health and maintenance assessment engine 260 may filter one type of information by another type of information (e.g., determine which aircraft operate in high-salinity environments based on the health data and provide maintenance information related to those aircraft operating in high-salinity environments). In another example embodiment, health and maintenance assessment engine 260 may determine the accuracy of one type of information by using another type of information (e.g., determine accuracy of sensor-based health information based on maintenance information). In another example embodiment, health and maintenance assessment engine 260 analyzes performance of individual aircraft components using health data and/or maintenance data and assesses the performance of component suppliers 272-276 based on the performance of the components they provided. Component suppliers 272-276 may represent any entity that provides components for an aircraft, including but not limited to, parts manufacturers.

Figure 3:
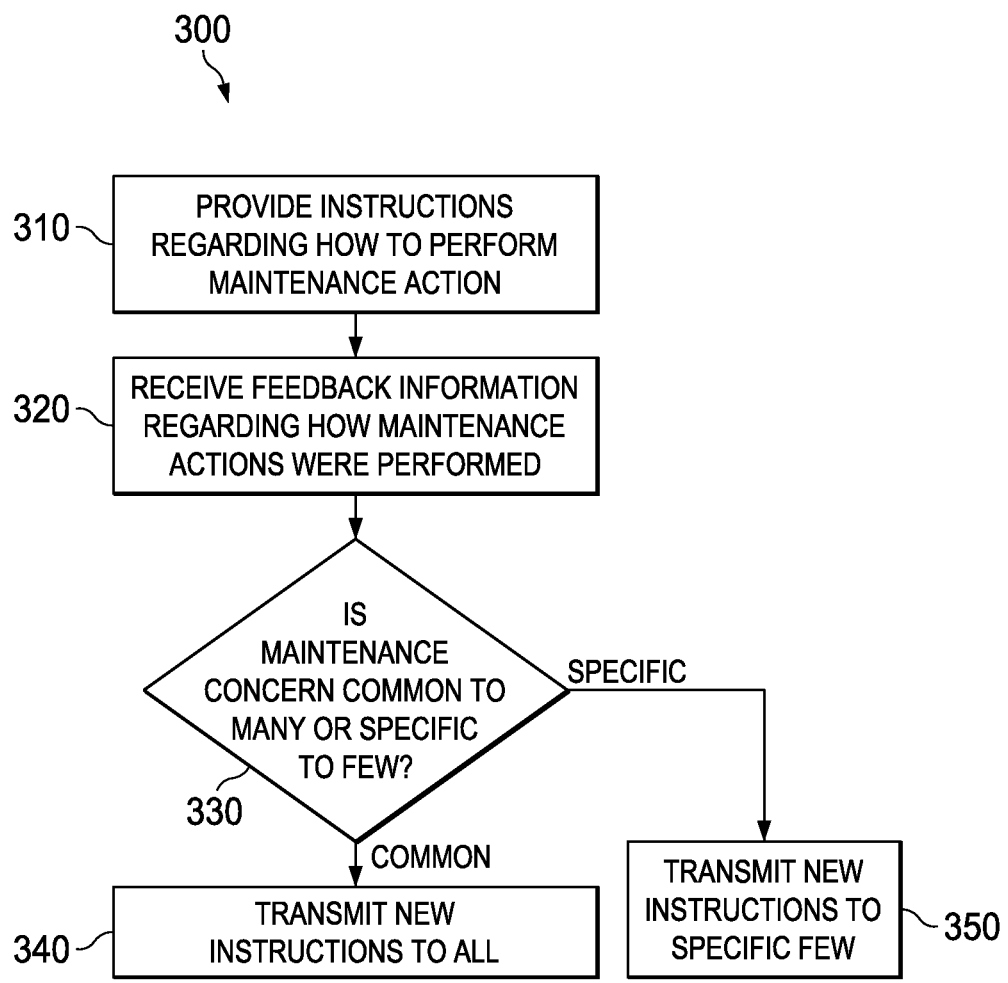
FIG. 3 shows a method of providing aircraft maintenance feedback using the system of FIG. 2 according to one example embodiment.

In operation, according to one example embodiment, system 200 may implement the example method 300 of FIG. 3. In the example of FIG. 3, technical publication system 220 provides instructions to operators 202-206 regarding how to perform an aircraft maintenance action at step 310. In this example of FIG. 3, operators 202-206 may represent aircraft maintainers that perform aircraft maintenance actions on aircraft.

In some embodiments, technical publication system 220 and/or other elements of system 200 may utilize one or more computers 10. For example, in some embodiments, the process of providing instructions regarding how to perform the aircraft maintenance action may include generating, with a processor such as processor 12, the instructions regarding how to perform the aircraft maintenance action; storing the instructions regarding how to perform the aircraft maintenance action in one or more memory locations such as memories 18; and providing access to at least one of the one or more memory locations to the plurality of aircraft maintainers.

At step 320, maintenance analysis engine 210 receives feedback information associated with how each of the aircraft maintainers performed the aircraft maintenance action using the provided instructions. In one example embodiment, the feedback information is included in the maintenance data 202*a*-206*a* provided by operators 202-206. This maintenance data 202*a*-206*a* may include, for example, maintenance log information and maintenance procedure comments provided by the aircraft maintainers.

In some embodiments, however, the feedback information may include other sources of information. Such other sources of information may include, but are not limited to health information extracted from sensor data 202*b*-206*b*. For example, maintenance effectiveness may be assessed by correlating maintenance information with health information that identifies intermittent failures. Such correlations may reveal, for example, whether an aircraft maintainer effectively performed the aircraft maintenance action or whether the problem persisted after performance of the aircraft maintenance action. As another example, maintenance-induced damage may be assessed by assessing health changes that occur when an aircraft maintenance action is performed. In general, health data may suggest maintenance-induced damage if the health changes have a space and/or time correlation with a maintenance event. For example, if an aircraft maintainer replaces a driveshaft while accessing a component but fails to properly index the driveshaft during reinstallation, the health data may indicate an increase in driveshaft vibrations. As will be explained in greater detail below, more analysis may be necessary to determine whether maintenance-induced damage, such as the incorrectly-indexed driveshaft, is the result of inadequate maintenance instructions or poor performance by the aircraft maintainer.

In some circumstances, the feedback information may reflect a maintenance concern. A maintenance concern may represent any indication that a maintenance action is not being performed properly and/or efficiently. As one example, the feedback information may include information indicating an amount of time taken by each aircraft maintainer to read the instructions when performing the aircraft maintenance action. This feedback information may reveal that, although most aircraft maintainers are reading the instructions when performing the aircraft maintenance action, other aircraft maintainers are attempted to perform the maintenance action from memory. In this example, the maintenance concern may represent a concern that specific aircraft maintainers are not following the proper procedures and that, although the maintenance actions may or may not have been performed correctly, those specific aircraft maintainers are at an increased risk of performing the maintenance action incorrectly in the future (e.g., because they forget details in the provided instructions or fail to notice that new instructions have been provided).

If the feedback information reflects a maintenance concern, maintenance analysis engine 210 may determine at step 330 whether the maintenance concern is potentially common to many aircraft maintainers or are specific to one or more aircraft maintainers. In some embodiments, maintenance analysis engine 210 may determine whether the maintenance concern is potentially common to many aircraft maintainers or are specific to one or more aircraft maintainers based on comparisons of the information received from different aircraft maintainers.

Consider an example in which the feedback information includes information indicating an amount of time taken by each aircraft maintainer to perform the aircraft maintenance action. In this example, maintenance analysis engine 210 may determine whether a maintenance concern reflected by the feedback information is potentially common to all of the plurality of aircraft maintainers or is limited to a specific one or more of the plurality of aircraft maintainers by comparing the amount of time taken by each aircraft maintainer to perform the aircraft maintenance action to an expected amount of time to perform the aircraft maintenance action. Next, maintenance analysis engine 210 may calculate, for each aircraft maintainer, a variance between the amount of time taken by each aircraft maintainer to perform the aircraft maintenance action and the expected amount of time to perform the aircraft maintenance action. Maintenance analysis engine 210 may determine whether the maintenance concern is potentially common to all of the plurality of aircraft maintainers or is limited to the specific one or more of the aircraft maintainers based on how many of the plurality of aircraft maintainers experienced similar variances between the amount of time taken by the aircraft maintainers to perform the aircraft maintenance action and the expected amount of time to perform the aircraft maintenance action.

Thus, for example, if the expected repair time for an aircraft maintenance action is two hours, but most of the aircraft maintainers are taking six hours to complete the aircraft maintenance action, then maintenance analysis engine 210 may conclude that the maintenance concern is potentially common to all the aircraft maintainers. Such could be the case, for example, if the provided instructions are not accurate or may easily be interpreted in an inaccurate way. If, on the other hand, most of the aircraft maintainers are taking approximately two hours to complete the aircraft maintenance action, but one aircraft maintainer is taking six hours, then maintenance analysis engine 210 may conclude that the maintenance concern is limited to that one specific aircraft maintainer. In this example scenario, the provided instructions may be sufficient, but the one specific aircraft maintainer may require additional training.

In the example of FIG. 3, new instructions may be transmitted to all of the aircraft maintainers at step 340 if the maintenance concern is potentially common to all or many of the aircraft maintainers. In some scenarios, these new instructions may replace all or some of the previously-provided instructions or may supplement the previously-provided instructions with new information. In one example embodiment, technical publication system 220 provides the new instructions to all of the aircraft maintainers by releasing a new publication containing the new instructions. In another example embodiment, operator feedback system 230 requests and/or arranges for all of the aircraft maintainers to receive additional training regarding how to perform the aircraft maintenance action.

In some embodiments, maintenance analysis engine 210 may determine that the maintenance concern is potentially common to all or many of the aircraft maintainers because the issue is with the aircraft component itself. For example, if the aircraft maintenance information indicates that the component is showing wear or being replaced more quickly than expected, this information could indicate a problem with the component, not the maintainers. Accordingly, maintenance analysis engine 210 may arrange for a service bulletin to be issued. This service bulletin may instruct the aircraft maintainers to replace the component with a similar (and hopefully improved) version of the component. In some embodiments, the timing of this service bulletin may change depending on the severity of the maintenance concern. A maintenance concern that raises a significant grounding or air-worthiness issue may require that the service bulletin be executed immediately. On the other hand, a maintenance concern that only arises after a component is repaired may only require that the service bulletin be executed the next time that component is due for repair/replacement. An example of this latter scenario might include a situation in which aircraft maintainers are unable to correctly reinstall a component because physical properties of the component have changed (e.g., elastomeric material expands when the component is removed and prevents the component from being reinstalled into the same physical space).

Note that an entity such as an aircraft manufacturer may treat a potential maintenance concern as affecting all aircraft maintainers even if the potential maintenance concern is not the fault of the aircraft manufacturer. Teachings of certain embodiments recognize that system 200 should encourage entities such as aircraft manufacturers to provide new instructions to aircraft maintainers without admitting fault. Likewise, teachings of certain embodiments recognize the capability to provide more frequent and more accurate instructions as compared to the status quo while acknowledging that systems such as system 200 may not identify every maintenance concern.

If the maintenance concern is specific to only one or more specific aircraft maintainers, on the other hand, new instructions may be transmitted to only those specific aircraft maintainers at step 350. In some scenarios, these new instructions may replace all or some of the previously-provided instructions or may supplement the previously-provided instructions with new information. In one example embodiment, technical publication system 220 provides the new instructions to the specific aircraft maintainers by sending a new publication containing the new instructions to the specific aircraft maintainers. In another example embodiment, operator feedback system 230 requests and/or arranges for the specific aircraft maintainers to receive additional training regarding how to perform the aircraft maintenance action.

Teachings of certain embodiments also recognize the capability to prioritize deployment of new instructions. For example, new instructions pertaining to all aircraft maintainers may take priority over new instructions pertaining to specific individual aircraft maintainers (or group of maintainers). New instructions pertaining to potential maintenance concerns that raise airworthiness issues may take priority over new instructions pertaining to low-impact issues. New instructions pertaining to potential maintenance concerns that could result in maintenance-induced damage may take priority over new instructions pertaining to potential maintenance concerns that do not implicate other aircraft components. In a resource-constrained environment, the ability of system 200 to prioritize corrective actions may increase the likelihood of the highest-priority maintenance concerns being addressed.

Figure 4:
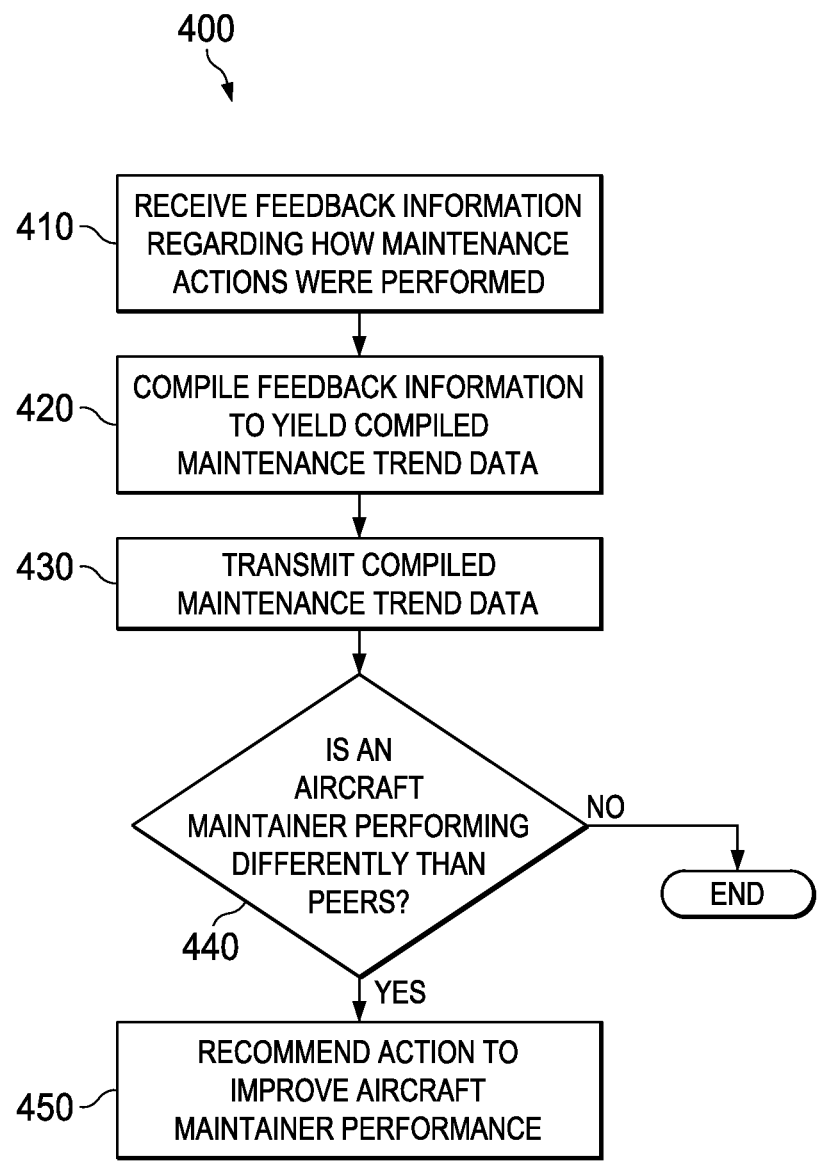
FIG. 4 shows a method of providing aircraft fleet maintenance feedback using the system of FIG. 2 according to one example embodiment.

In operation, according to another example embodiment, system 200 may implement the example method 400 of FIG. 4. In the example of FIG. 4, maintenance analysis engine 210 receives feedback information associated with how each of the aircraft maintainers performed the aircraft maintenance action using the provided instructions at step 410. Example embodiments of feedback information may include, but is not limited to, information identifying maintenance hours per task (e.g., man hours), maintenance duration per task, and maintenance start and end times.

Feedback information may indicate, for example, how efficiently each aircraft maintainer performed the aircraft maintenance action (e.g., how long each aircraft maintainer took to complete the performance action or how many man-hours each aircraft maintainer took to complete the performance action). In some scenarios, this feedback information may include information associated with how aircraft maintainers performed the aircraft maintenance action on multiple occasions if, for example, the maintenance action is a task that is performed repeatedly.

In some embodiments, the feedback information received from each of the plurality of aircraft maintainers may include information associated with how individual personnel associated with each of the aircraft maintainers performed the aircraft maintenance action. Teachings of certain embodiments recognize that tracking and analyzing maintenance information down to the personnel-level may allow aircraft maintainers to assess performance of its employees/contractors.

In one example embodiment, the feedback information is included in the maintenance data 202a-206a provided by operators 202-206. In this example of FIG. 4, operators 202-206 may represent aircraft maintainers that perform aircraft maintenance actions on aircraft.

In some embodiments, actions taken at step 410 may resemble actions taken at step 320 during performance of method 300. In some example embodiments, technical publication system 220 provides instructions to operators 202-206 regarding how to perform an aircraft maintenance action prior to performance of step 410, as may be the case with regard to step 320 of method 300.

At step 420, maintenance analysis engine 210 may compile the feedback information received from the aircraft maintainers to yield maintenance trend data. This maintenance trend data may represent, for example, performance of multiple aircraft maintainers within a peer group. In some embodiments, membership of the peer group may be anonymous to the individual peer group members.

Operator feedback system 220 may transmit the maintenance trend data to the aircraft maintainers at step 430. Teachings of certain embodiments recognize that transmitting the maintenance trend data to the aircraft maintainers may allow the aircraft maintainers to assess their performance relative to their peers. In some embodiments, such transmitted maintenance trend data may include a comparison of the compiled maintenance trend data to the feedback information.

In some embodiments, maintenance analysis engine 210, operator feedback system 230, and/or other elements of system 200 may utilize one or more computers 10. For example, in some embodiments, the process of compiling the feedback information to yield maintenance trend data may include storing the received feedback information in a first plurality of memory locations, such as memories 18, and calculating, with a processor such as processor 12, the compiled maintenance trend data from the stored feedback information. As another example, in some embodiments, the process of transmitting the compiled maintenance data may include storing the new instructions in a second plurality of memory locations (which may or may not be the same as the first plurality of memory locations mentioned above) and providing access to at least one of the second plurality of memory locations to at least one of the plurality of aircraft maintainers.

In some embodiments, method 400 may continue to step 440, where maintenance analysis engine 210 determines whether an aircraft maintainer is performing differently than its peers. Such may be the case, for example, if maintenance analysis engine 210 identifies an unexpectedly-large variance between performance of the aircraft maintainer and performance of the aircraft maintainer's peers. This analysis may share similarities with analyses performed during step 330 of method 300, such as where maintenance analysis engine 210 determines whether the maintenance concern is potentially common to all of the plurality of aircraft maintainers or is limited to the specific one or more of the aircraft maintainers based on how many of the plurality of aircraft maintainers experienced similar variances between the amount of time taken by the aircraft maintainers to perform the aircraft maintenance action and the expected amount of time to perform the aircraft maintenance action.

If an aircraft maintainer is performing differently than its peers, maintenance analysis engine 210 may recommend action to improve the aircraft maintainer's performance. Some of the recommended actions may be similar to the actions taken during steps 340 and 350 of method 300. For example, maintenance analysis engine 210 may recommend that technical publication system 220 provide new instructions to the aircraft maintainer or recommend that operator feedback system 230 arrange for additional training for the aircraft maintainer.

Figure 5:
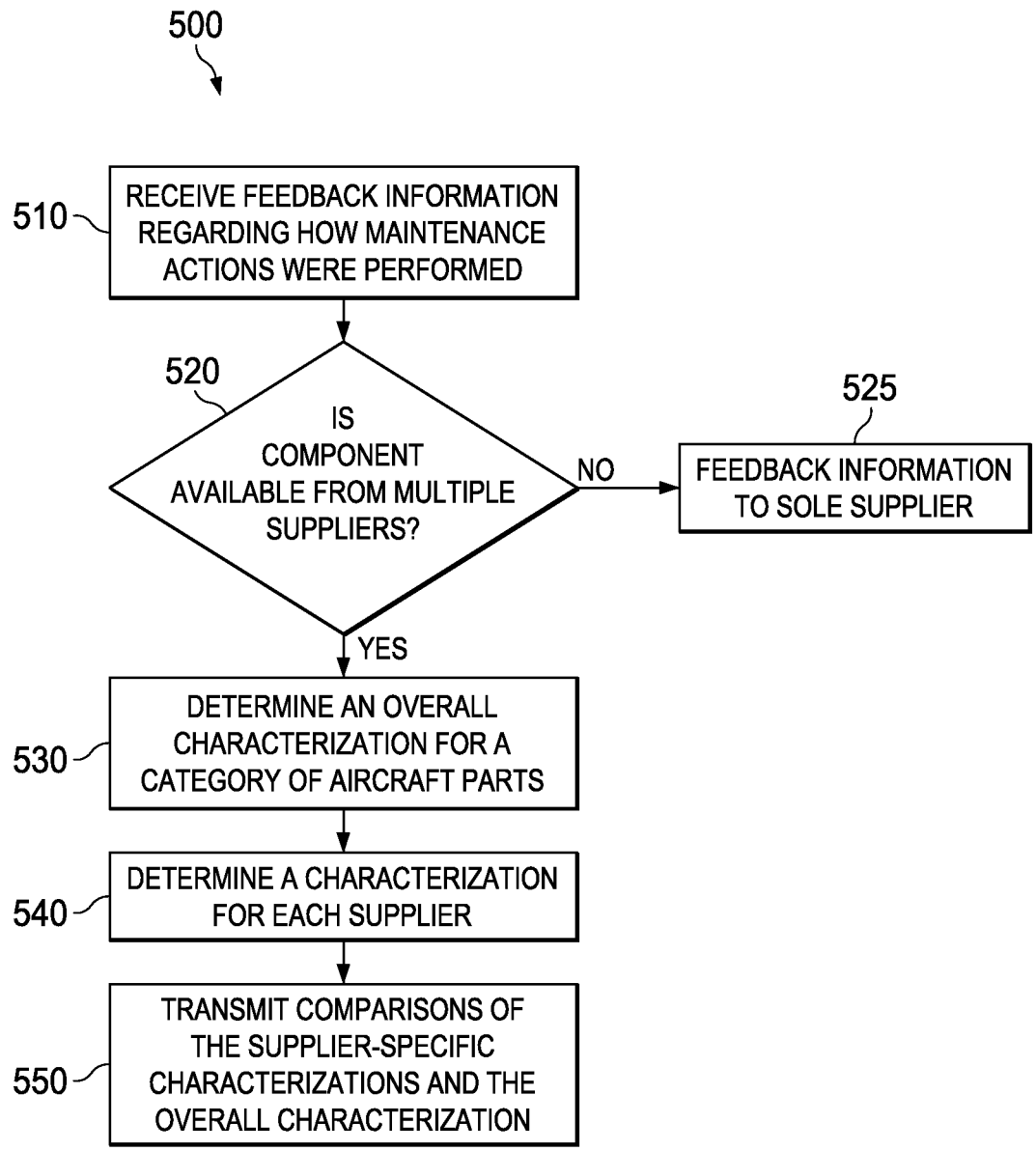
FIG. 5 shows a method of providing aircraft supplier feedback using the system of FIG. 2 according to one example embodiment.

In operation, according to another example embodiment, system 200 may implement the example method 500 of FIG. 5. In the example of FIG. 5, health and maintenance assessment engine 260 receives feedback information associated with how each of the aircraft maintainers performed the aircraft maintenance action using the provided instructions at step 510. In this example, the aircraft maintenance action pertains to an aircraft component supplied by one or more aircraft component suppliers, such as suppliers 272-276. Although this example discusses an individual part that is supplied by one or more aircraft component suppliers, method 500 also applies more broadly to a type or category of aircraft components supplied by one or more aircraft component suppliers.

In some embodiments, the feedback information is included in the maintenance data 202a-206a provided by operators 202-206. In this example of FIG. 5, operators 202-206 may represent aircraft maintainers that perform aircraft maintenance actions on aircraft. In one example embodiment, the feedback information includes information representative of how frequently the aircraft maintainers perform the aircraft maintenance actions.

In some embodiments, actions taken at step 510 may resemble actions taken at steps 320 and/or 410 during performance of methods 300 and 400, respectively. In some example embodiments, technical publication system 220 provides instructions to operators 202-206 regarding how to perform an aircraft maintenance action prior to performance of step 510, as may be the case with regard to step 320 of method 300 and/or step 410 of method 400.

At step 520, health and maintenance assessment engine 260 identifies whether the aircraft component associated with the maintenance action is provided by one or by multiple, different aircraft component suppliers. If only one aircraft component supplier provides the part, the feedback information may be processed for forwarding to the sole supplier at step 525. If, on the other hand, on the other hand, multiple aircraft component suppliers provide parts, and each component may have been provided from one of multiple sources, then the method may proceed to step 530.

Teachings of certain embodiments recognize that identifying whether the aircraft component associated with the maintenance action is provided by one or by multiple, different component suppliers may help determine the source of the maintenance issue. For example, consider a vendor A that makes avionics box X for an aircraft and a vendor B makes avionics box Y for the same aircraft. If both boxes are failing early (compared to vendor-supplied MTBF), that may indicate an issue with the aircraft (e.g., the avionics bay may get too hot, causing early failures). If only one of the two boxes is failing early compared to expectation, then this could indicate one vendor has a problem.

At step 530, health and maintenance assessment engine 260 determines an overall characterization for a category of aircraft parts provided by the different, multiple suppliers. An example of an overall characterization might include an overall failure rate of the category of aircraft parts. In some embodiments, health and maintenance assessment engine 260 may determine the overall failure rate based on information from maintenance data 202a-206a and/or sensor data 202b-206b.

At step 540, health and maintenance assessment engine 260 determines a characterization specific to aircraft parts provided by each supplier. An example of a overall characterization specific to each supplier might include a failure rate of the category of aircraft parts specific to each supplier. In some embodiments, health and maintenance assessment engine 260 may determine the supplier-specific failure rate based on information from maintenance data 202a-206a and/or sensor data 202b-206b.

In some embodiments, health and maintenance assessment engine 260 and/or other elements of system 200 may utilize one or more computers 10. For example, in some embodiments, the process of determining an overall characterization for the category of aircraft parts might include storing the received feedback information in one or more memory locations, such as memories 18, and calculating, with a processor such as processor 12, the overall characterization from the feedback information stored in the one or more memory locations. As another example, in some embodiments, the process of determining characterizations specific to aircraft parts provided by each supplier might include calculating, with a processor such as processor 12, the supplier-specific characterizations using the feedback information stored in the one or more memory locations.

At step 550, health and maintenance assessment engine 260 transmits comparisons of the supplier-specific characterizations and the overall characterization to each different supplier. For example, health and maintenance assessment engine 260 may transmit, to each supplier, information representative of that supplier's characterization and information representative of the overall characterization; in this example, the supplier may then perform its own comparison of the two sets of information. Thus, health and maintenance assessment engine 260 may send individual supplier data and (anonymous) peer group data (like failure rates or time between failures), and each supplier may perform its own comparison and then evaluate its performance based on this comparison.

In some embodiments, health and maintenance assessment engine 260 may perform the steps of method 500 using just the data contained in maintenance data 202a-206a. In several embodiments, however, health and maintenance assessment engine 260 may also rely on other sources of information, including information from sensor data 202*b*-206*b*. For example, health information extracted from sensor data 202*b*-206*b* may be used to filter the maintenance information.

In one example embodiment, health and maintenance assessment engine 260 receives sensor data 202*b*-206*b* from a plurality of aircraft. Health and maintenance assessment engine 260 may identify an operating condition associated with at least some of the plurality of aircraft and determine, based on the feedback information and the sensor data received, an overall operating-condition-specific characterization for the category of aircraft parts. In addition, health and maintenance assessment engine 260 may determine, based on the feedback information and the sensor data received, operating-condition-specific characterizations for each of the suppliers. Next, health and maintenance assessment engine 260 may transmit comparisons of the operating-condition-specific characterizations for each supplier and the overall characterization to each different supplier.

Figure 6:
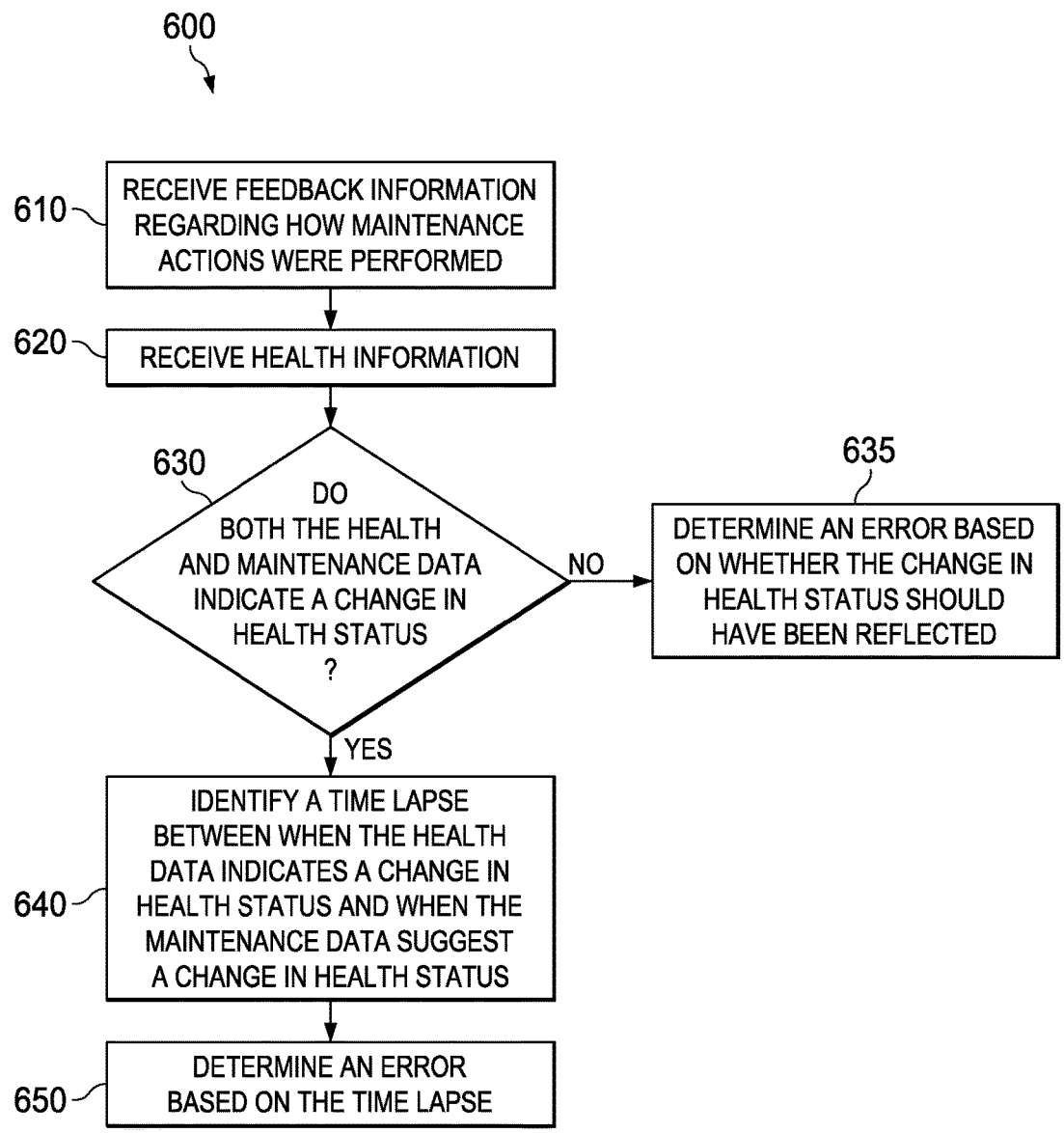
FIG. 6 shows a method of providing aircraft health feedback using the system of FIG. 2 according to one example embodiment.

In operation, according to another example embodiment, system 200 may implement the example method 600 of FIG. 6. In the example of FIG. 6, health and maintenance assessment engine 260 receives feedback information associated with how each of the aircraft maintainers performed the aircraft maintenance action using the provided instructions at step 610.

In some embodiments, the feedback information is included in the maintenance data 202*a*-206*a* provided by operators 202-206. Operators 202-206 may represent, for maintenance actions on aircraft. In some embodiments, actions taken at step 610 may resemble actions taken at steps 320, 410 and/or 510 during performance of methods 300, 400, and 500, respectively. In some example embodiments, technical publication system 220 provides instructions to operators 202-206 regarding how to perform an aircraft maintenance action prior to performance of step 610, as may be the case with regard to step 320 of method 300, step 410 of method 400, and/or step 510 of method 500.

At step 620, health and maintenance assessment engine 260 receives health information. In some embodiments, the health information is included in the sensor data 202*b*-206*b* provided by operators 202-206.

At step 630, health and maintenance assessment engine 260 determines whether the health data and the feedback data both indicate potential changes in health status of an aircraft part within the category of aircraft parts.

If only one of the data sets indicate the potential changes in health status, then health and maintenance assessment engine 260 may determine existence of an error based on whether the change in health status should have been reflected in both data sets. If, for example, the health data from the sensor data 202*b*-206*b* indicates a change in health status that was not detected by the aircraft maintainers during their inspections (and therefore was not identified in the feedback information from the aircraft maintainers), then health and maintenance assessment engine 260 may determine that the health data contains an error (e.g., a false positive error). Such an error in the health data might include a sensor error or a calculation error. As another example, if the health data from the sensor data 202*b*-206*b* indicates a change in health status that was not detected by the sensors (and therefore was not reflected in the sensor data 202*b*-206*b*), then health and maintenance assessment engine 260 may determine that the health data contains a false-negative error.

If both data sets indicate the potential changes in health status, then at step 640, health and maintenance assessment engine 260 may identify a time lapse between when the health data indicates the potential change in health status of the aircraft part occurred and when the feedback information indicates that the potential change in health status was identified by at least one of the aircraft maintainers.

At step 650, health and maintenance assessment engine 260 may determine an error in at least one of the health data and the feedback information based on the time lapse. For example, the error may be due to early/late reporting by the maintenance data or early/late reporting by the health data. In some scenarios, this "error" is not a bad thing. For example, the health data may report a change in health status early, but this "error" may allow the health data to predict when aircraft components will fail.

In some embodiments, health and maintenance assessment engine 260 and/or other elements of system 200 may utilize one or more computers 10. For example, in some embodiments, the process of determining an error based on the time lapse information may include storing time-lapse information reflecting the time lapse in a one or more memory locations, such as memories 18, and calculating, with a processor such as processor 12, the error based on the time-lapse information stored in the one or more memory locations.

In some scenarios, the time lapse may be so small as to suggest that neither the maintenance information nor the health information contains an error. In such a scenario, health and maintenance assessment engine 260 may use a strong correlation between the maintenance information and the health information to validate one or both sets of information.

In many of the embodiments described herein, information may be gathered from one entity (e.g., an operator) and provided to a different entity (e.g., other operators, suppliers, aircraft OEMs, etc.). Teachings of certain embodiments recognize the capability to anonymize data that is transferred by removing information that identifies the data provider and/or by only transmitting amalgamated trend data instead of data unique to only one data provider.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. An aircraft maintenance system, comprising:
   an interface configured to:
      receive aircraft maintenance information, wherein the aircraft maintenance information comprises information associated with aircraft maintenance performed on a plurality of aircraft parts by a plurality of aircraft maintainers; and transmit a list of maintenance instructions; and
a processor configured to:
obtain, via the interface, the aircraft maintenance information;
receive, from sensors onboard a rotorcraft, sensor data associated with the plurality of aircraft parts;
assess effectiveness of the aircraft maintenance based on the aircraft maintenance information and the sensor data, wherein assessing the effectiveness of the aircraft maintenance comprises:
identifying, based on the sensor data, damage to one or more of the plurality of aircraft parts,
determining, from the aircraft maintenance information, that the aircraft maintenance was performed based on a previously-provided maintenance instruction from the list of maintenance instructions, wherein the processor tracks electronic access to the list of maintenance instructions via the interface over time,
responsive to identifying the damage, the processor extracts, from the sensor data, a time at which the damage was indicated and a location on the rotorcraft corresponding to the damage and the processor extracts, based on the tracking of the electronic access, a time at which the maintenance task was performed and a location on the rotorcraft at which the maintenance task was performed, and
determining that the damage is maintenance-induced damage based on the processor automatically correlating the time at which the maintenance task was performed with the time at which the damage was indicated and automatically correlating the location on the rotorcraft at which the maintenance task was performed with the location on the rotorcraft corresponding to the damage;
generate maintenance trend data based on the aircraft maintenance information and the effectiveness of the aircraft maintenance, wherein the maintenance trend data comprises an indication of one or more maintenance trends associated with the maintenance-induced damage and the aircraft maintenance performed by the plurality of aircraft maintainers;
identify one or more aircraft maintainers associated with the maintenance-induced damage, wherein the one or more aircraft maintainers are identified from the plurality of aircraft maintainers;
generate a new maintenance instruction to replace the previously-provided maintenance instruction based on the indication of one or more maintenance trends associated with the maintenance-induced damage;
reprioritize the list of maintenance instructions by adding the new maintenance instruction within the list of maintenance instructions in place of the previously-provided maintenance instruction to generate a reprioritized version of the list of maintenance instructions, wherein the new maintenance instruction takes priority over others in reprioritized version of the list of maintenance instructions; and
provide, via the interface, the reprioritized version of the list of maintenance instructions to the one or more aircraft maintainers associated with the maintenance-induced damage.

2. The aircraft maintenance system of claim 1, wherein the aircraft maintenance information comprises a duration of time spent performing the aircraft maintenance by each aircraft maintainer of the plurality of aircraft maintainers.

3. The aircraft maintenance system of claim 1, wherein the aircraft maintenance information comprises a duration of time spent consulting a maintenance instruction by each aircraft maintainer of the plurality of aircraft maintainers, wherein the maintenance instruction comprises one or more instructions associated with performing the aircraft maintenance.

4. The aircraft maintenance system of claim 1, wherein the damage comprises a problematic aircraft component associated with the aircraft maintenance performed by the plurality of aircraft maintainers.

5. The aircraft maintenance system of claim 1, wherein the reprioritized version of the list of maintenance instructions comprises a recommended action to improve performance of a maintenance action by the one or more aircraft maintainers associated with the damage.

6. The aircraft maintenance system of claim 5, wherein the recommended action comprises additional maintenance training for the one or more aircraft maintainers associated with the damage.

7. The aircraft maintenance system of claim 1, wherein the previously-provided maintenance instruction comprises an inadequate maintenance instruction associated with the aircraft maintenance performed by the plurality of aircraft maintainers.

8. The aircraft maintenance system of claim 1, wherein the processor is configured to release a new publication containing the new maintenance instruction.

9. A method comprising:
obtaining, by a processor via an interface, aircraft maintenance information, wherein the aircraft maintenance information comprises information associated with aircraft maintenance performed on a plurality of aircraft parts by a plurality of aircraft maintainers;
receiving, by the processor from sensors onboard a rotorcraft, sensor data associated with the plurality of aircraft parts;
assessing effectiveness of the aircraft maintenance based on the aircraft maintenance information and the sensor data, wherein assessing the effectiveness of the aircraft maintenance comprises:
identifying, based on the sensor data, damage to one or more of the plurality of aircraft parts,
determining, from the aircraft maintenance information, that the aircraft maintenance was performed based on a previously-provided maintenance instruction from a list of maintenance instructions, wherein the processor tracks electronic access to the list of maintenance instructions via the interface over time,
responsive to identifying the damage, extracting, by the processor from the sensor data, a time at which the damage was indicated and a location on the rotorcraft corresponding to the damage and extracting, based on the processor tracking the electronic access, a time at which the maintenance task was performed and a location on the rotorcraft at which the maintenance task was performed,
determining that the damage is maintenance-induced damage based on the processor automatically correlating the time at which the maintenance task was performed with the time at which the damage was indicated and automatically correlating the location on the rotorcraft at which the maintenance task was performed with the location on the rotorcraft corresponding to the damage;
generating maintenance trend data based on the aircraft maintenance information and the effectiveness of the aircraft maintenance, wherein the maintenance trend data comprises an indication of one or more maintenance trends associated with the maintenance-induced damage and the aircraft maintenance performed by the plurality of aircraft maintainers;

identifying one or more aircraft maintainers associated with the maintenance-induced damage, wherein the one or more aircraft maintainers are identified from the plurality of aircraft maintainers;

generating a new maintenance instruction to replace the previously-provided maintenance instruction based on the indication of one or more maintenance trends associated with the maintenance-induced damage;

reprioritizing the list of maintenance instructions by adding the new maintenance instruction within the list of maintenance instructions in place of the previously-provided maintenance instruction to generate a reprioritized version of the list of maintenance instructions, wherein the new maintenance instruction takes priority over others in the reprioritized version of the list of maintenance instructions; and providing, via the interface, the reprioritized version of the list of maintenance instructions to the one or more aircraft maintainers associated with the maintenance-induced damage.

10. The method of claim 9, wherein the aircraft maintenance information comprises a duration of time spent performing the aircraft maintenance by each aircraft maintainer of the plurality of aircraft maintainers.

11. The method of claim 9, wherein the aircraft maintenance information comprises a duration of time spent consulting a maintenance instruction by each aircraft maintainer of the plurality of aircraft maintainers, wherein the maintenance instruction comprises one or more instructions associated with performing the aircraft maintenance.

12. The method of claim 9, wherein the damage comprises a problematic aircraft component associated with the aircraft maintenance performed by the plurality of aircraft maintainers.

13. The method of claim 9:
wherein the reprioritized version of the list of maintenance instructions comprises a recommended action to improve performance of a maintenance action by the one or more aircraft maintainers associated with the damage.

14. The method of claim 13, wherein the recommended action comprises additional maintenance training for the one or more aircraft maintainers associated with the damage.

15. The method of claim 9:
wherein the previously-provided maintenance instruction comprises an inadequate maintenance instruction associated with the aircraft maintenance performed by the plurality of aircraft maintainers.

16. The method of claim 9, releasing a new publication containing the new maintenance instruction.

17. A non-transitory machine readable medium having machine-executable instructions embodied thereon, wherein the instructions, when executed on a processor of the machine, causes the machine to:
obtain, via an interface, aircraft maintenance information, wherein the aircraft maintenance information comprises information associated with aircraft maintenance performed on a plurality of aircraft parts by a plurality of aircraft maintainers;

receive, from sensors onboard a rotorcraft, sensor data associated with the plurality of aircraft parts;

assess effectiveness of the aircraft maintenance based on the aircraft maintenance information and the sensor data, wherein assessing the effectiveness of the aircraft maintenance comprises:
identifying, based on the sensor data, damage to one or more of the plurality of aircraft parts,
determining, from the aircraft maintenance information, that the aircraft maintenance was performed based on a previously-provided maintenance instruction from a list of maintenance instructions, wherein the machine tracks electronic access to the list of maintenance instructions via the interface over time,
responsive to identifying the damage, the machine extracts, from the sensor data, a time at which the damage was indicated and a location on the rotorcraft corresponding to the damage and the machine extracts, based on the tracking of the electronic access, a time at which the maintenance task was performed and a location on the rotorcraft at which the maintenance task was performed, and
determining that the damage is maintenance-induced damage based on the processor automatically correlating the time at Which the maintenance task was performed with the time at which the damage was indicated and automatically correlating the location on the rotorcraft at which the maintenance task was performed with the location on the rotorcraft corresponding, to the damage;

generate maintenance trend data based on the aircraft maintenance information and the effectiveness of the aircraft maintenance, wherein the maintenance trend data comprises an indication of one or more maintenance trends associated with the maintenance-induced damage and the aircraft maintenance performed by the plurality of aircraft maintainers;

identify one or more aircraft maintainers associated with the maintenance-induced damage, wherein the one or more aircraft maintainers are identified from the plurality of aircraft maintainers;

generate a new maintenance instruction to replace the previously-provided maintenance instruction based on the indication of one or more maintenance trends associated with the maintenance-induced damage;

reprioritize the list of maintenance instructions by adding the new maintenance instruction within the list of maintenance instructions in place of the previously-provided maintenance instruction to generate a reprioritized version of the list of maintenance instructions, wherein the new maintenance instruction takes priority over others in the reprioritized version of the list of maintenance instructions; and provide, via the interface, the reprioritized version of the list of maintenance instructions to the one or more aircraft maintainers associated with the maintenance-induced damage.

18. The non-transitory machine readable medium of claim 17, wherein the aircraft maintenance information comprises a duration of time spent consulting a maintenance instruction by each aircraft maintainer of the plurality of aircraft maintainers, wherein the maintenance instruction comprises one or more instructions associated with performing the aircraft maintenance.

* * * * *